United States Patent [19]
Jeong

[11] Patent Number: 6,011,834
[45] Date of Patent: Jan. 4, 2000

[54] APPARATUS AND METHOD FOR PROVIDING AUTOMATIC TELEPHONE RESPONSE SERVICE BY USING INTELLIGENT PERIPHERAL SYSTEM

[75] Inventor: Kwang-Jae Jeong, Daejeon, Rep. of Korea

[73] Assignees: Electronics and Telecommunication Research Institute, Daejeon; Korea Telecommunication Authority, Chongno-Ku Seoul, both of Rep. of Korea

[21] Appl. No.: 08/826,526

[22] Filed: Apr. 3, 1997

[30] Foreign Application Priority Data

Jun. 7, 1996 [KR] Rep. of Korea ............... 96-20305

[51] Int. Cl.[7] ................................................ H04M 1/64
[52] U.S. Cl. .................. 379/88.26; 379/211; 379/230
[58] Field of Search .................... 379/230, 201, 379/210, 211, 212, 213, 214, 88.25, 88.26

[56] References Cited

U.S. PATENT DOCUMENTS 5,535,263 7/1996 Blumhardt .............................. 379/230
5,572,583 11/1996 Wheeler, Jr. et al. .................. 379/201
5,712,903 1/1998 Bartholomew et al. ................ 379/230

*Primary Examiner*—Fan S. Tsang
*Attorney, Agent, or Firm*—Antonelli, Terry, Stout & Kraus, LLP

[57] ABSTRACT

A method for providing automatic telephone response services by using an intelligent peripheral system (IP) is disclosed. Particularly the invention provides to an apparatus and a method for providing automatic telephone response services by using an IP, in which, when the called subscriber is absent or when the line is busy, the caller records a vocal message in the IP by using the IP instead of a recording device so as for the called subscriber to be able to receive the message later, and therefore, general telephone subscribers having no automatically responding telephone can receive the recorded vocal message through the IP when the called subscriber is absent or the line is busy.

12 Claims, 12 Drawing Sheets

----------- MANAGEMENT DATA LINK
─────────── AUDIO BAND CHANNEL
──⌇── SS NO. 7
── ── ── SIGNAL CHANNEL

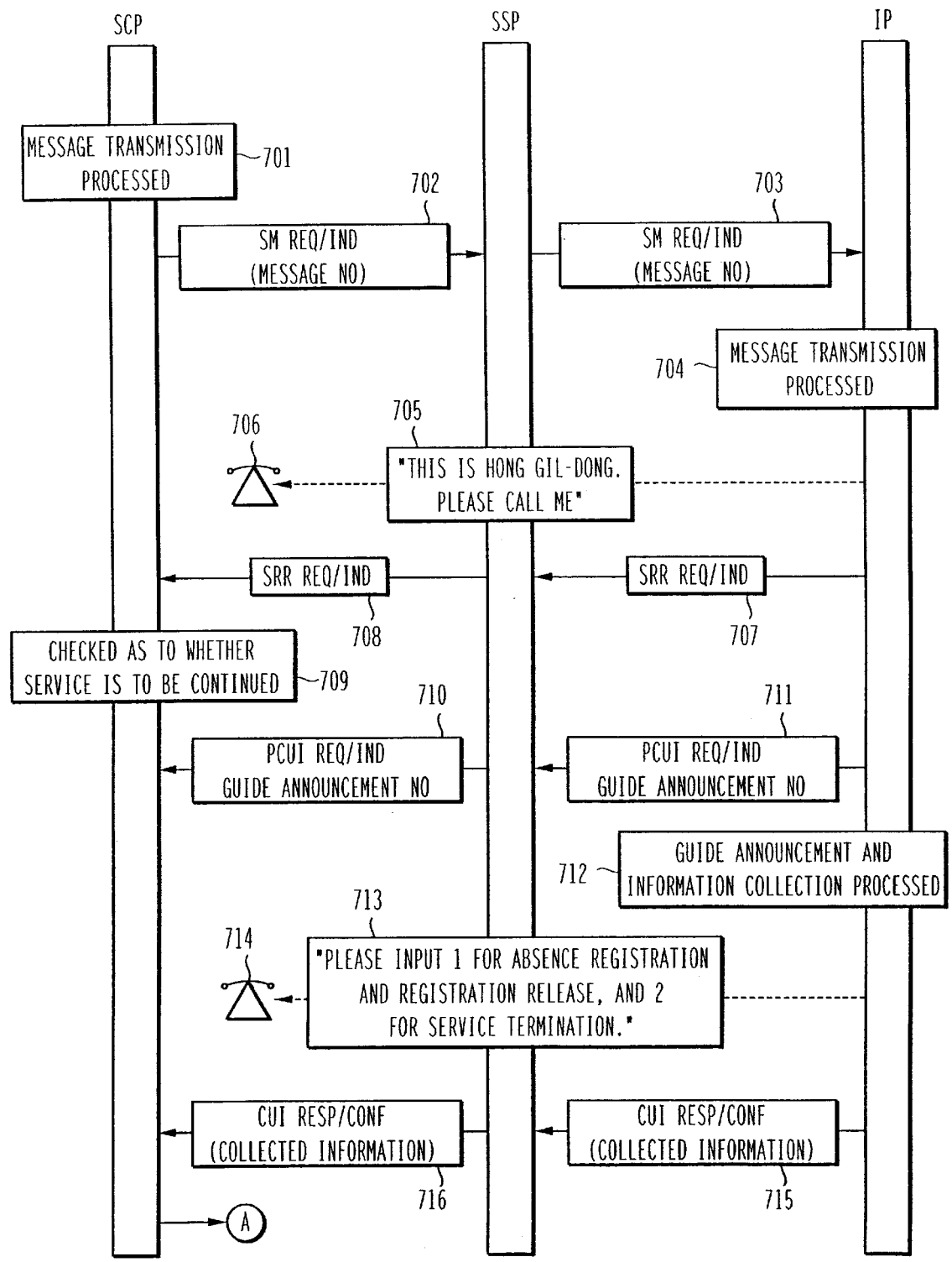

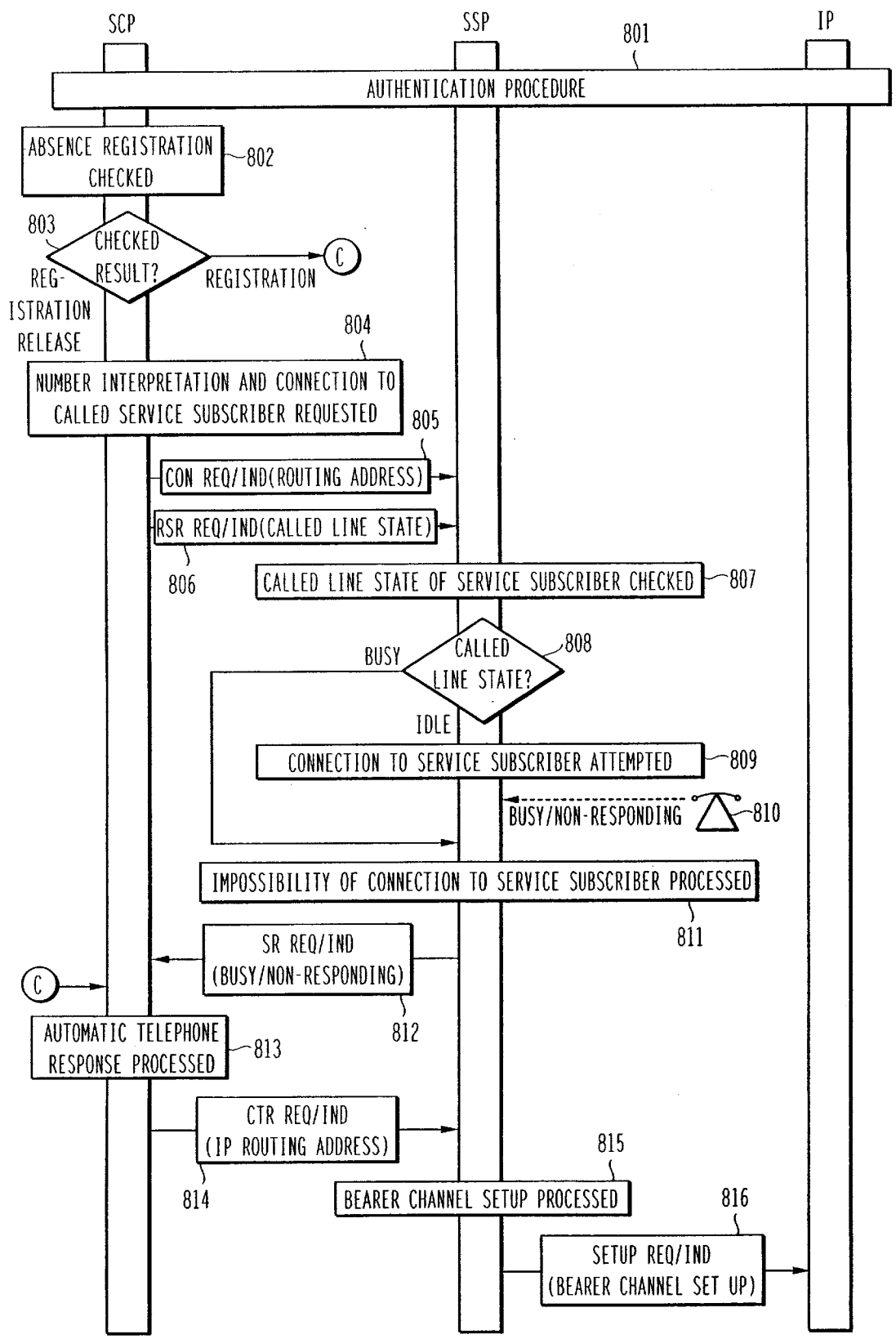

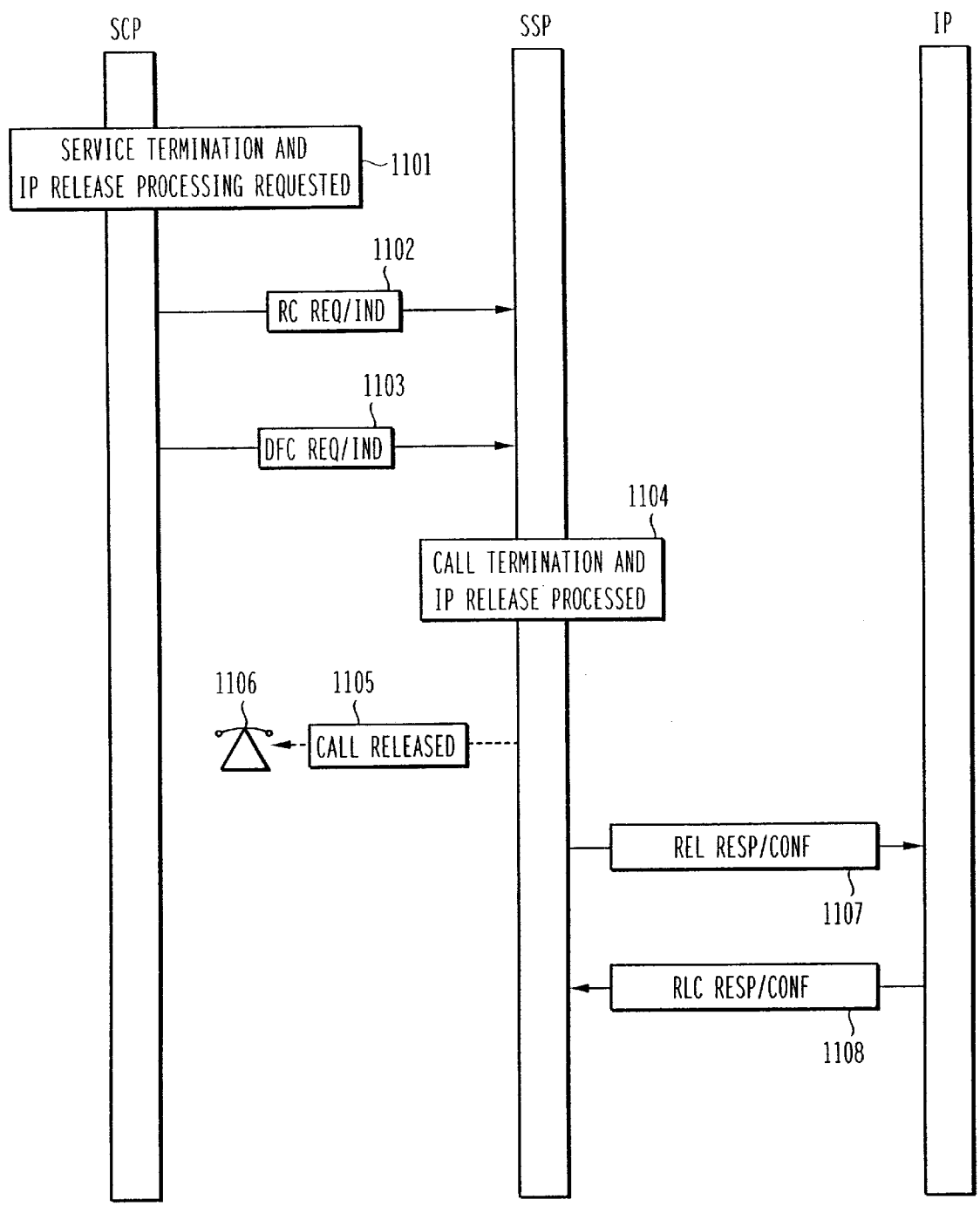

APPARATUS AND METHOD FOR PROVIDING AUTOMATIC TELEPHONE RESPONSE SERVICE BY USING INTELLIGENT PERIPHERAL SYSTEM

BACKGROUND OF THE INVENTION

1. Field of the Invention

The present invention relates to a method for providing automatic telephone response services by using an intelligent peripheral system (hereinafter called "IP"). More specifically, the present invention relates to an apparatus and a method for providing automatic telephone response services by using an IP, in which, when the called subscriber is absent or when the line is busy, the caller records a voice message in the IP by using the IP instead of a recording device so as for the called subscriber to be able to receive the message later, and therefore, general telephone subscribers having no automatically responding telephone can receive the recorded vocal message through the IP when the called subscriber is absent or the line is busy.

2. Description of the Prior Art

Generally, in accordance with the progress in the communication network technology, the conception of the IP network has appeared. As a result, the early IP network has been constructed, and currently the IP network services are being furnished. However, the IP network services need to be diversified in accordance with the demand of the users. Further, the IP network has evolved from the early primitive IP network to a sophisticated IP network. Further it is provided with a standard by the ITU-T (International Telecommunication Union-Telecommunication Standardization Sector).

That is, in order to expand the utilization of the IP network services as early as possible, and to build up the technical basis of the IP networks, the IP network is being subjected to a standardization. Further, the service switching point (to be called "SSP" below) and the service control point (to be called "SCP" below) which connect the IP network to the telephone network and to the integrated service digital network (to be called "ISDN" below) are also being standardized.

The automatic telephone responding service operates such that the called subscriber can receive a voice message when the line is busy or the subscriber is absent, even if the telephone subscriber does not have an automatic responding telephone. For calls demanded by the existing PSTN or the ISDN, an SSP (service switching point) authorizes the calls needing the IP network services, collects information on them, carries out a routing for the calls for furnishing automatic responding services, and asks to an SCP (service control point) for the data for service processing, while the SCP furnishes the data needed for carrying out the services. An IP transmits guide announcements to the service users, and collects a digit information needed for carrying out the service logic to furnish it to the SCP.

Further, the IP stores the voice messages under the service logic control of the SCP, and these stored messages can be transmitted to the service subscribers. The called service subscribers who have subscribed to this service register their absence for when they are not able to receive calls or when the lines are busy. Later, in accordance with the registration of the subscriber's absence, the callers' calls are connected to the called service subscribers, or are connected to the IP, so that the automatic responding services can be performed. The voice messages which are recorded in the IP can be received to the called service subscribers when the called service subscribers are authenticated by inputting secret numbers so as to verify the authenticity.

In the existing general telephone service, a telephone subscriber can receive the automatic responding service only when the subscriber has an automatic responding telephone with a recording device attached thereon. Also, the subscriber's voice can be recorded on a private automatic branch exchange (PABX) by utilizing an independent information furnishing system connected to the subscriber line, so that voice messages can be exchanged.

However, the currently used automatic responding telephone cannot record a message when the line is busy. In the independent information furnishing system, a caller can record a message, and the called subscriber can receive it later. Therefore, an indirect communication is possible between the caller and the called subscriber. However, when the line of the called service subscriber is busy after an attempt of a call, there is no function of recording a voice massage. In such a case, the servicing is available only to a small number of subscribers by connecting to the PABX. That is, a wide servicing is impossible.

However, every user has diversified desires for services and wants to receive services at a low cost. In order to meet these desires, the conception of the IP network was proposed, and it has come to be put to the practical use.

Therefore, whenever direct telephone communication is impossible, one who does not have an automatic responding telephone needs to receive messages later from the IP which stores the messages of callers. That is, such a servicing is in demand.

SUMMARY OF THE INVENTION

The present invention is intended to overcome the above described problems of the current situation.

Therefore it is an object of the present invention to provide an apparatus and a method for providing automatic telephone response services by using an IP, in which an INAP operation is utilized for furnishing automatic telephone responding services.

In achieving the above object, the apparatus for providing automatic telephone response services by using an IP according to the present invention includes: an LE (local exchange) for receiving a request for services from a telephone network subscriber; an SSP for triggering a relevant service logic upon authenticating the request for an automatic telephone responding service by a service user, for asking an SCP to process the request, and for carrying out a routing to an IP; the IP furnishing a special service to the service user under a control of the SCP through SSP, and receiving input data of the service user so as to store them; the SCP having service logic and data for furnishing services so as to process and control automatic telephone responding services; an SMS (service management system) for changing and managing the data and logic needed for carrying out the services; and an STP for transmitting an SS (signaling system) No. 7 message between the SCP and the SSP.

In another aspect of the present invention, the method for providing automatic telephone response services by using an IP according to the present invention includes the steps of: authenticating a request for an automatic telephone responding service when a service subscriber dials a service access code (SAC) and a mail number (MN); verifying the results of the authentication regarding the SAC and the MN; determining a type of SAC when the authentication is successful; carrying out a procedure for selecting a function if the judged SAC is an SAC 1; listening to and receiving a recorded message based on the function selecting procedure; registering or releasing an absence in a service subscriber profile of an SCP based on the function selecting procedure; recording a voice message into a relevant MN if the type of the SAC is an SAC 2, and if the service subscriber is absent or non-responding or if the line is busy; attempting to input an error or to retry when the authentication of the SAC, MN and a secret number are not successful; reporting a failure or retrying within a limit of a permitted number of retrying; and terminating the service when exceeding the limit of the permitted number of retrying.

BRIEF DESCRIPTION OF THE DRAWINGS

The above object and other advantages of the present invention will become more apparent by describing in detail the preferred embodiment of the present invention with reference to the attached drawings in which:

FIG. 7 illustrates the recorded message listening procedure in the automatic telephone responding service;

FIGS. 8A and 8B illustrate the automatic telephone responding procedure in the automatic telephone responding service;

FIG. 11 illustrates the service terminating procedure in the automatic telephone responding service.

DETAILED DESCRIPTION OF THE PREFERRED EMBODIMENT

Figure 1:
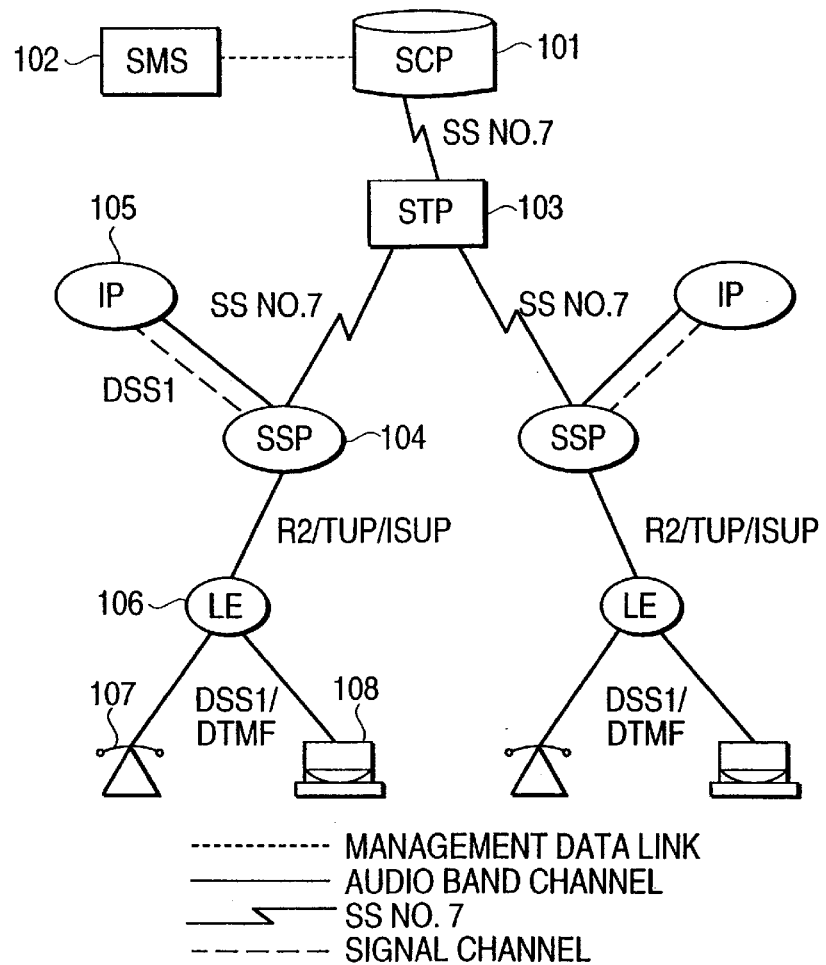
FIG. 1 illustrates the constitution of the IP network for automatic telephone responding service.

FIG. 1 illustrates the constitution of the IP network for automatic telephone responding service. In this drawing, based on the currently used IP and the IP under study, there are included an SSP 104, an SCP 101, and an IP 105, a service management system (to be called "SMS" below) 102, and a signaling transfer point (to be called "STP" below) 103 as the major constituents.

In the signaling method between the SSP 104, the SCP 101 and the IP 105, it is assumed that the SCP 101 controls the resources of the IP 105 through the SSP 104. The IP 105 holds resources such as guide announcements, voice signal processing and the like, so that the service user can conveniently use the services. Thus additional information can be collected from the service user, or a guide announcement can be given to an unfinished call. Further, the IP 105 holds a special resources for providing an automatic telephone responding service, so that the service user can record a voice message.

The SSP 104 recognizes the request for automatic telephone responding service by a service user, triggers the relevant service logic, and asks the SCP 101 to process the service. Further, the SSP 104 carries out signal transfers between the service user, the SCP 101 and the IP 105, and carries out the routing to the IP 105.

In the present invention, the SSP 104 which is a constituent of the IP network processes the IP service request of an LE (local exchange) 106 under the assumption that the service is not of a local use but of a toll type.

The SCP 101 carries out the function of processing and controlling the automatic telephone responding service based on the service logic and the data needed for furnishing the service.

The IP 105 possesses the network resources related to the service processing, and is controlled by the SCP 101 through the SSP 104 so as to furnish special resources to the service user, and so as to collect and hold the input data of the service user.

The SMS 102 changes and manages the logic and data which are required for carrying out the service and which are operated by the network operator.

The STP 103 transfers SS (signaling system) No. 7 messages between the SCP 101 and the SSP 104. That is, the signaling method between the SSP 104 and the SCP 101 is carried out in such a manner that the operations are given and received by utilizing the SS No. 7. The signaling method between the SSP 104 and the IP 105 is carried out in such a manner that the messages are given and received by utilizing a digital subscriber signal (to be called "DSS" below) No. 1. Further, the signaling method between the SSP 104 and the LE 106 is carried out by using an R2 telephone user part (to be called "TUP" below) and an ISDN user part (to be called "ISUP" below). The signaling method between the telephone network subscribers 107 and 108 and the LE 106 is carried out by using a DSS1 or a DTMF (dual tone multi-frequency).

Figure 2A:
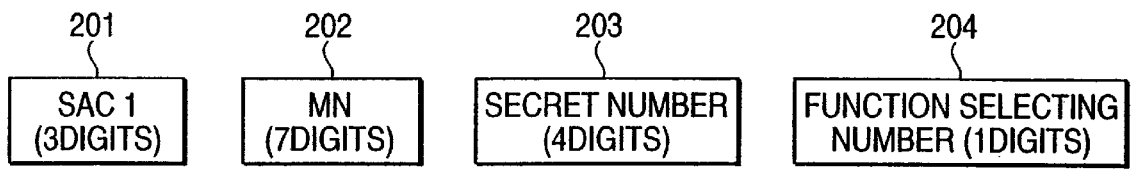
FIGS. 2A and 2B illustrate the service use number system for the automatic telephone responding service.
Figure 2B:

FIGS. 2A and 2B illustrate the service use number system for the automatic telephone responding service.

The system basically includes a service access code (to be called "SAC" below) 201, a mail number (to be called "MN" below) 202, a secret number 203 and a function selecting number 204. Further, additionally special numbers can be used for improving the service quality such as reinforcing of the security function, an addition of special services and the like. The service use number system is tentatively defined by the SAC 201 and 205 of 3 digits, the MN 202 and 206 of 7 digits, the secret number 203 of four digits, and the function selecting number 204 of one digit. The inputting of the respective numbers is classified into two cases based on the service procedure as shown in FIGS. 2A and 2B.

In order to recognize the automatic telephone responding service request from the service subscriber, the service furnisher (the network operator) defines the two SAC 201 and 205.

FIG. 2A illustrates a case in which the service subscriber wants to receive the service by inputting the MN 202 and the secret number 203. In this case, the service furnisher checks the MN 202 and the secret number 203, and if they are valid, the function selecting number 204 is left to be selected. Thus the desired service is furnished, and the cost is charged to the relevant MN 202. The SAC which recognizes the automatic telephone responding service in accordance with the service subscriber is called "SAC 1" 201.

FIG. 2B illustrates a case in which the service non-subscriber inputs the MN 206, thereby requesting a call connection to a service subscriber, or leaving a voice message to the MN of the service subscriber. The SAC for requesting a call connection with a service subscriber and for leaving a voice message during the absence of the service subscriber is defined to be "SAC 2" 205.

Figure 3:
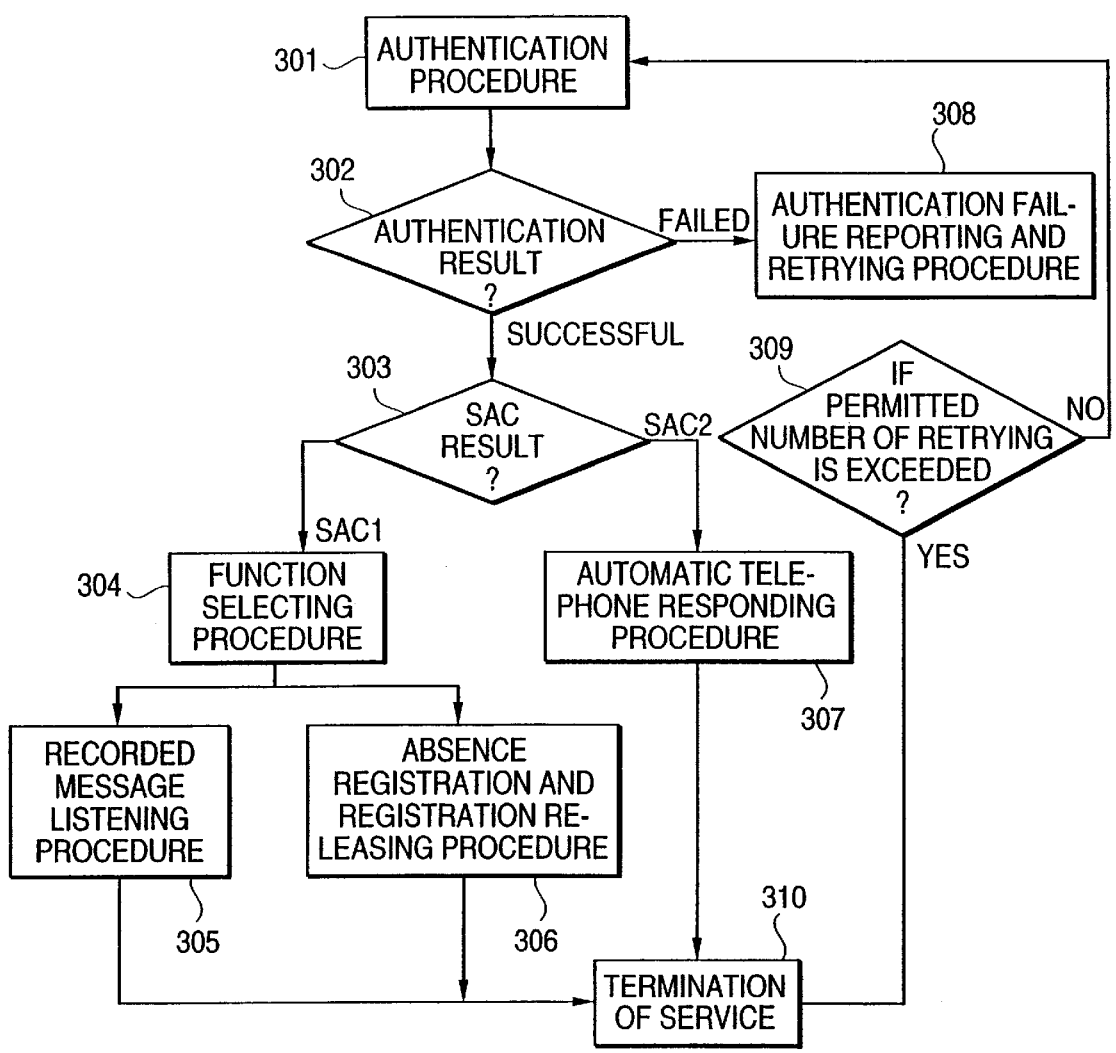
FIG. 3 illustrates the overall constitution of the automatic telephone responding service.

FIG. 3 illustrates the overall constitution of the automatic telephone responding service.

Here, the service includes: an authentication procedure 301, a function selecting procedure 304, an absence registration and registration releasing procedure 306, a recorded message listening procedure 305, an automatic telephone responding procedure 307, and an authentication failure reporting and retrying procedure 308.

If a service subscriber dials the SAC and MN to request an automatic telephone responding service, first the authentication procedure 301 is carried out to verify the SAC and the MN, whereby a judgment is made as to whether the service is to be furnished or not (302).

If the authenticaiton of the SAC and the MN are successfully carried out (302), the type of the SAC is determined (303). If it is the SAC 1, the function selecting procedure 304 is executed, while if it is the SAC 2, the automatic telephone responding procedure 307 is executed.

In the case of the SAC 1, the function selecting procedure is executed to select the recorded message listening procedure 305 or the absence registration and registration releasing procedure 306. Thus either the recorded voice message is received through the recorded message listening procedure 305, or the absent state of the service subscriber is registered in the service subscriber profile of the SCP.

When the absence release is carried out, the service subscriber can receive the recorded message. In the case of the SAC 2, the automatic telephone responding procedure 307 is executed. Through this procedure, the service user can record a voice message into the MN to pass it to the service subscriber, when the service subscriber is absent, is non-responding or busy.

When the authentication of the SAC, the MN and the secret number fail, the authentication failure reporting and retrying procedure 308 is executed within the limit of the permitted number of the re-tries. If the limit of the permitted number of re-tries is exceeded, the service is terminated (310).

Figure 4:
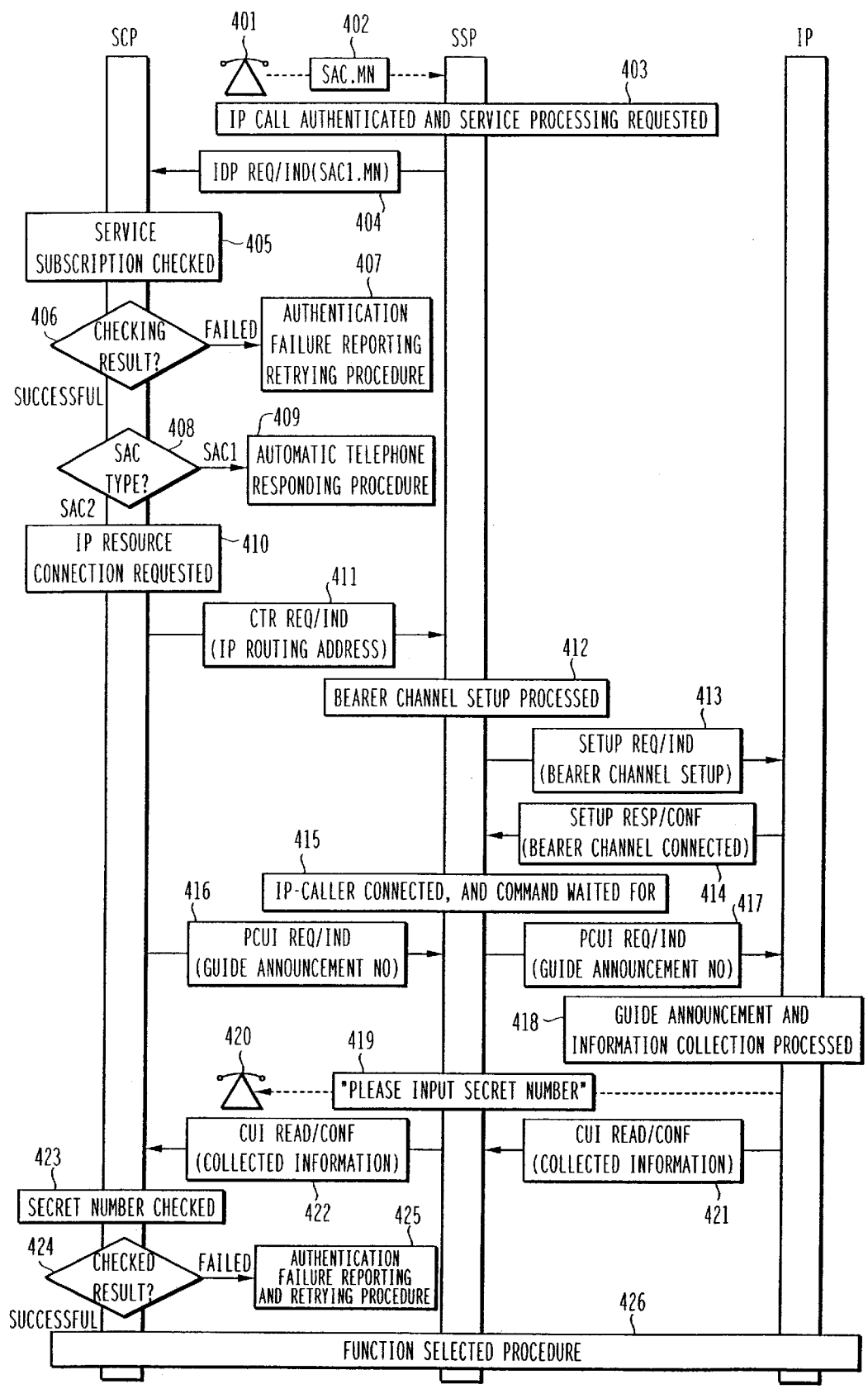
FIG. 4 illustrates the procedure of recognition in the automatic telephone responding service.

FIG. 4 illustrates the procedure of authentication in the automatic telephone responding service.

If the service subscriber or the service user hook off (to be called "H/off" below) (401), and dials the SAC and the MN (402), the SSP recognizes the automatic telephone responding service call (403). Then, in order to request the IP service processing to the SCP (403), the SSP sends an initial detection point request/indication (to be called "IDP req/ind" below) operation 404 together with the SAC and MN to the SCP. Upon receipt of the IDP req/ind 404, the SCP utilizes the service subscriber table to check on the validity of the subscriber (405) so as to judge as to whether the service is to be furnished or not.

If the checking 406 on the SAC and the MN fails, the authentication failure reporting and retrying procedure 407 is executed. If the checking 406 is successful, the type of the SAC is determined (408). In the case of the SAC 1, an automatic telephone responding procedure 409 is executed. In the case of the SAC 2, the SCP makes a resource connection request 410 with the IP at the SSP, so as to collect an additional information such as the secret number from the service subscriber. In order to do this, a connect to resource request/indication (to be called "CTR req/ind" below) operation 411 is transmitted.

Upon receipt of the CTR req/ind (IP routing address) 411, the SSP transmits a bearer setup request/indication (to be called "setup req/ind" below) operation 413 to the IP so as to attempt a bearer connection 412 with the IP in accordance with the IP routing address.

Upon receipt of the setup req/ind (bearer channel setup) 413, the IP transmits a bearer setup response/confirm (to be called "setup resp/conf" below) operation 414 to the SSP, if the resources are available.

Upon receipt of the setup resp/conf (bearer channel connection) 414, the SSP connects the IP to the service subscriber or the service user, and waits to receive an SCP command operation 415.

In order to transmit a guide announcement information to the IP for collecting an information on the secret number, the SCP transmits a prompt and collect user information request/indication (to be called "PCUI req/ind" below) operation 416 to the SSP. The SSP receives it to pass it to the IP.

In accordance with the PCUI req/ind (guide announcement number) 417, the IP transmits a resource 419 "Please input the secret number" to the subscriber 420. If the first digit information is being input by the subscriber, the guide announcement is terminated, and the digit information is collected, to be loaded on a collect user information response/confirm (to be called "CUI resp/conf" below) operation 421 so as to be sent through the SSP to the SCP.

The SCP receives the secret number information 422 to check it (423). If the checking fails (424), a recognition failure reporting and retrying procedure 425 is executed, while if it is successful, a function selecting procedure is executed (426).

Figure 5:
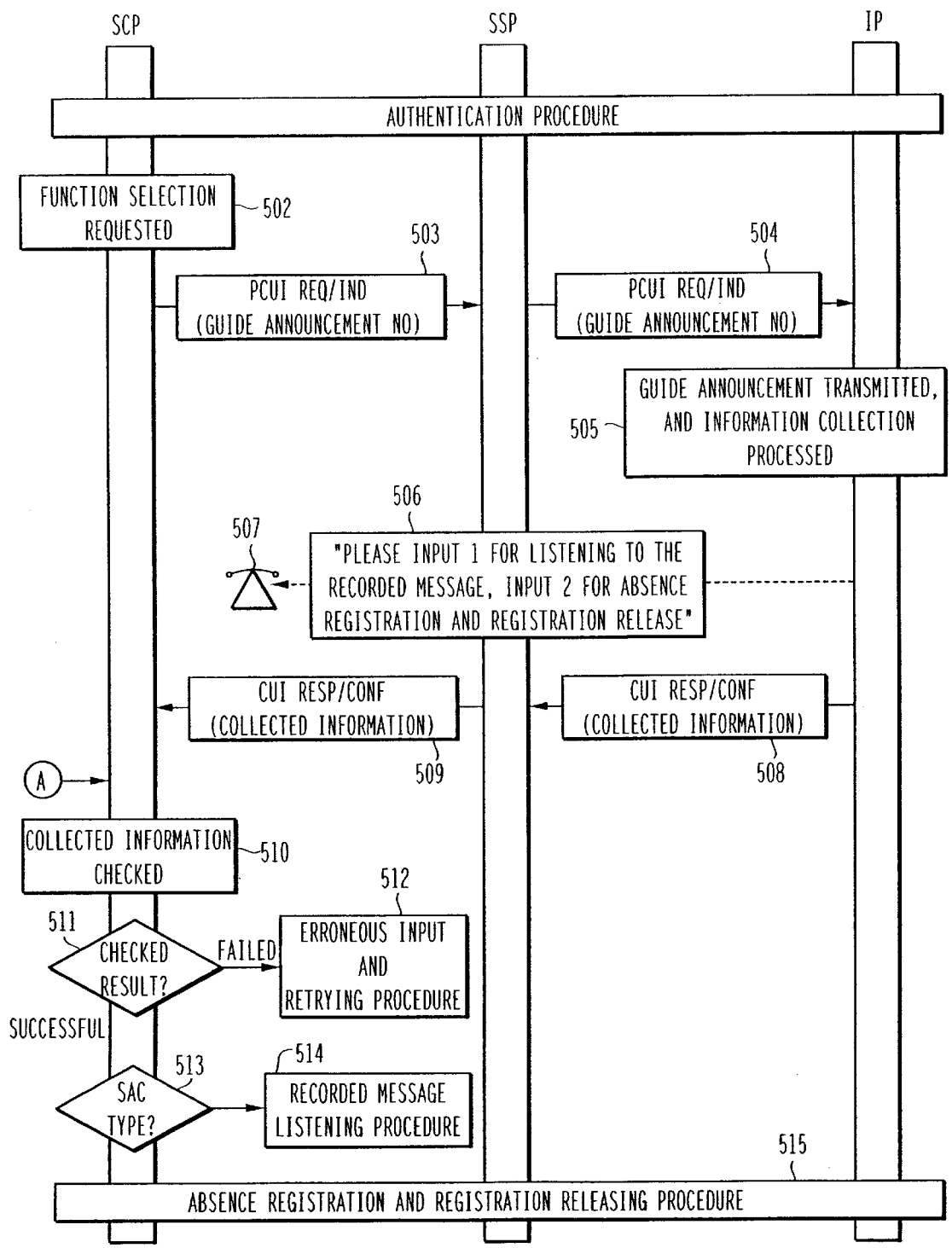
FIG. 5 illustrates the function selecting procedure in the automatic telephone responding service.

FIG. 5 illustrates the function selecting procedure in the automatic telephone responding service. This is a procedure in which the service subscriber who has been successful in an authentication procedure can select the recorded message listening or absence registering and registration releasing procedures.

When the authentication procedure 501 has been successfully carried out, the SCP loads a guide announcement information (for a function selection request 502) on the PCUI req/ind so as to send it through the SSP to the IP (504).

Upon receipt of the PCUI req/ind operation 504, the IP executes a guide announcement and information collection processing 505. For this purpose, in accordance with the PCUI req/ind (guide announcement number) 504, a resource 506 "Please input 1 for a recorded message, and input 2 for an absence registration and a registration release" is transmitted to the subscriber (507). When the first digit information is being input by the subscriber 507, the guide announcement is terminated, and the digit information is collected. The collected information is loaded on a CUI req/ind operation 508 to transmit it through the SSP to the SCP (509).

The SCP checks the received function selecting number (510), and if the checking fails (511), an error inputting and re-try procedure 512 is executed. When the checking is successful, if the function selecting number is 1, a recorded message listening procedure is executed (514), while if the number is 2, an absence registration and registration releasing procedure is executed (515).

Figure 6A:
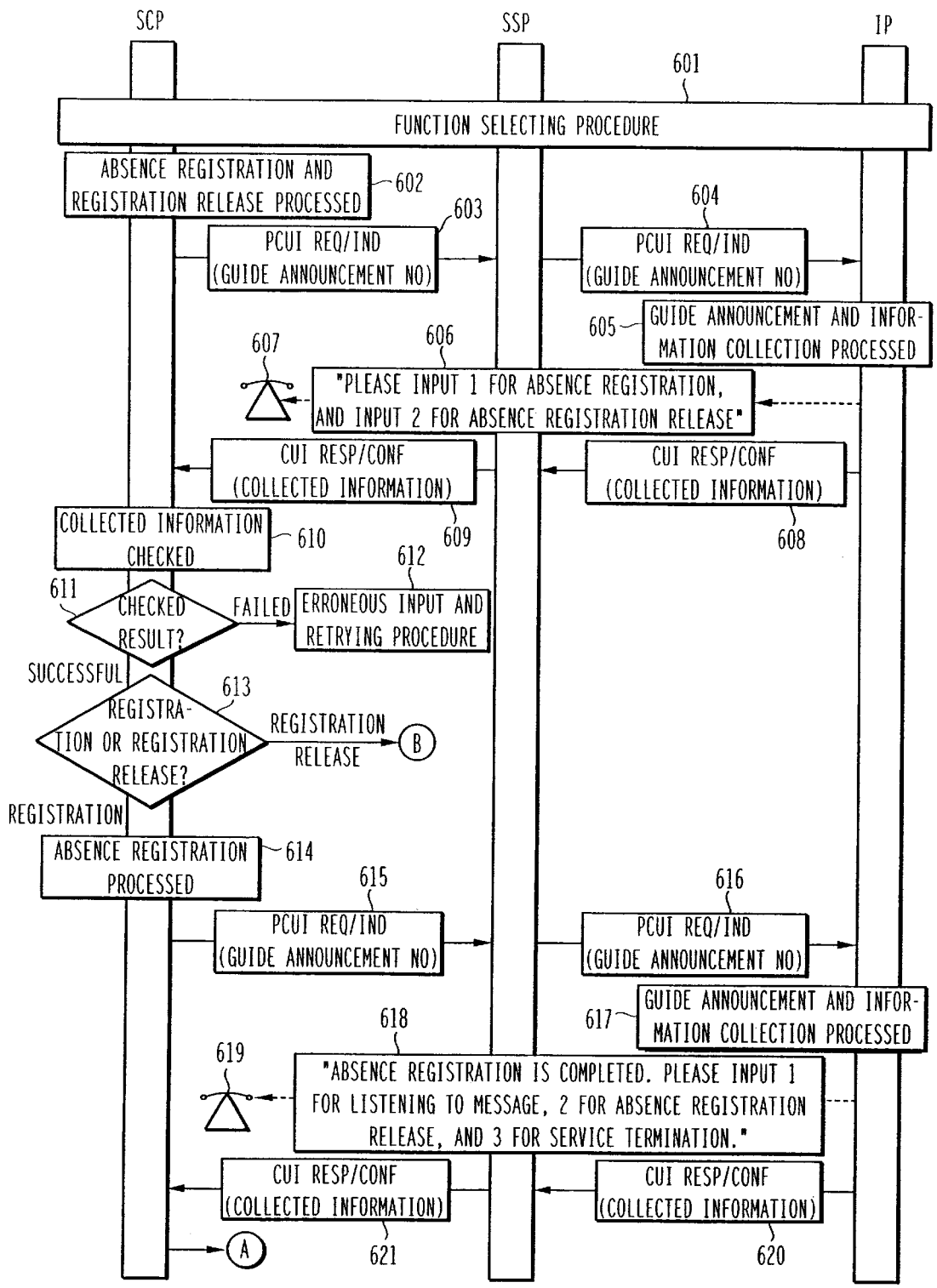
FIG. 6A illustrates the absence registering procedure in the automatic telephone responding service.
Figure 6B:
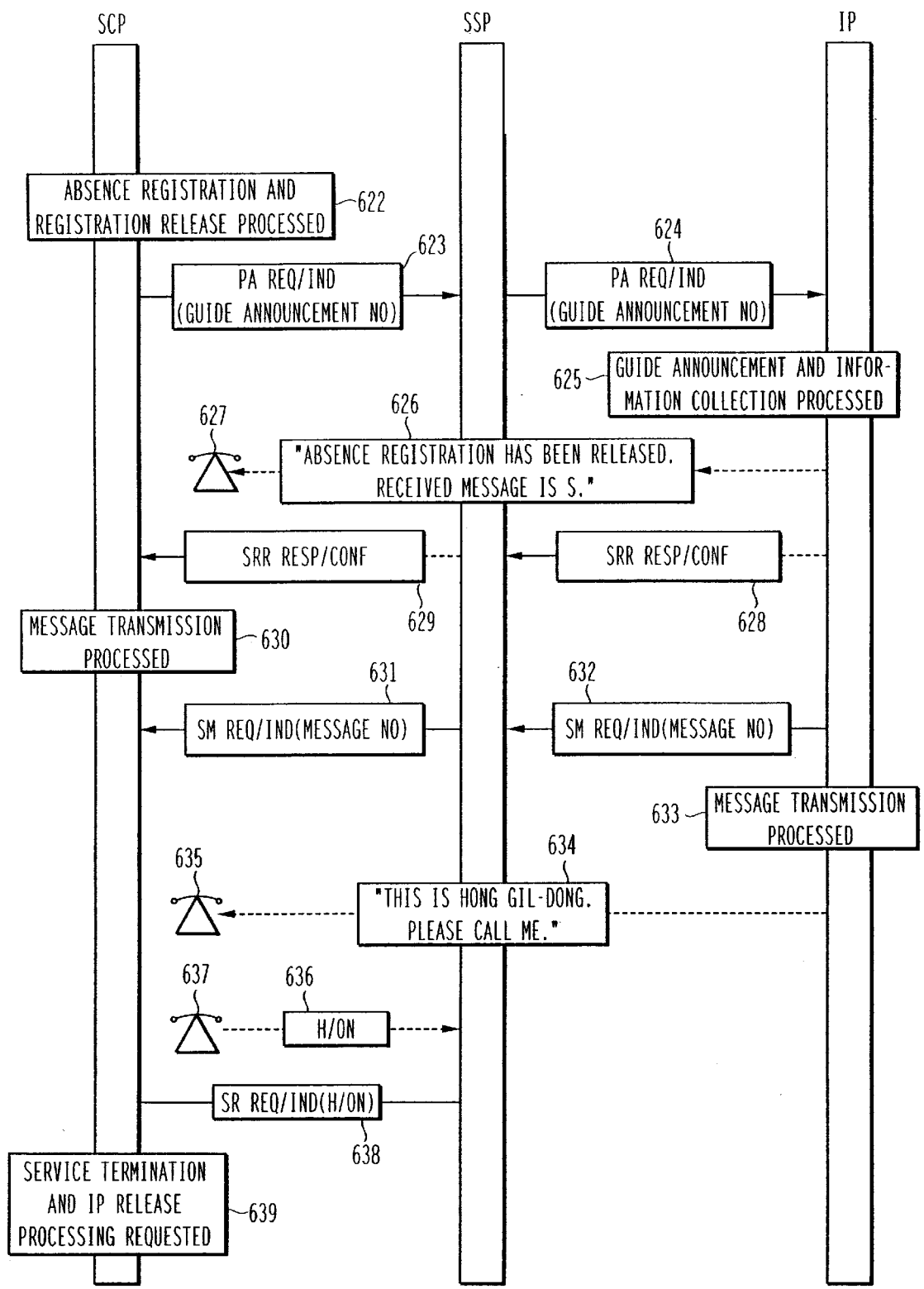
FIG. 6B illustrates the absence registration releasing procedure in the automatic telephone responding service.

FIG. 6A illustrates the absence registering procedure in the automatic telephone responding service. FIG. 6B illustrates the absence registration releasing procedure in the automatic telephone responding service. These are the procedures in which a service subscriber who has been successful in the authentication procedure can carry out an absence registration procedure and a registration releasing procedure through a function selecting procedure 601.

The SCP loads the guide announcement information for an absence registration and registration releasing 602 on a PCUI req/ind operation 603 so as to send it through the SSP to the IP (604).

Upon receipt of the PCUI req/ind operation (guide announcement number) 604, the IP transmits a resource 606 "Please input 1 for a recorded message, and input 2 for an absence registration and a registration release" to the subscriber 607, for executing a guide announcement and information collection processing 605. If the first digit information is being input by the subscriber, the guide announcement is terminated, and the digit information is collected and loaded on a CUI req/ind operation 608 so as to send it through the SSP to the SCP.

The SCP checks (610) the received absence registration and registration release information, and if the checking fails, an error inputting and retrying procedure 612 is executed. If the checking is successful, an absence registration processing 614 is executed for an absence registration in accordance with an absence registration and registration release standard 613. Further, in order to confirm whether the registration has been completed and whether the service is to be continued, a guide announcement information is loaded on a PCUI req/ind operation 615 to send it through the SSP to the IP.

Upon receipt of the PCUI req/ind operation 616, the IP executes a guide announcement and information collection processing 617. For this purpose, in accordance with the PCUI req/ind (guide announcement number) 616, a resource 618 "An absence registration has been done. Input 1 for listening to the recorded message, input 2 for the absence registration and registration release, and input 3 for a service termination" is transmitted to a subscriber 619. When a first digit information is being input by the subscriber 619, the guide announcement is terminated, and the digit information is collected to load it on a CUI req/ind operation 620 so as to send it through the SSP to the SCP (621).

In the case of the absence registration release 613, an absence registration release processing 622 is executed. Further, in order to report the registration release, the guide announcement information is loaded on a PA req/ind operation 623 so as to send it through the SSP to the IP.

Upon receipt of the PA req/ind operation 624, the IP executes a guide announcement processing 625. For this purpose, in accordance with the PA req/ind (announcement number) 624, a resource 626 "The absence registration has been released. The received messages are 3." is sent to the subscriber 627. After giving the guide announcement, the IP reports the completion of the guide announcement to the SCP. For this purpose, the IP transmits a specialized resource report response/confirm (to be called "SRR resp/conf" below) operation 628 through the SSP to the SCP.

Upon receipt of the SRR resp/conf operation, the SCP transmits a message (630) to the IP. For this purpose, the received message stored position and the message code information are loaded on a send-message request/indication (to be called "SM req/ind" below) operation 631 so as to be sent through the SSP to the IP (632).

In order to make a message transmission processing 633, the IP transmits (634) a voice message to the subscriber 635 by utilizing the message code information of a received SM req/ind operation 632. If the subscriber 637 hangs up a receiver/places the receiver on the hook (to be called "H/on" below) 636 after listening to the voice message, it is reported to the SCP. For this purpose, a status report request/indication (to be called "SR req/ind" below) operation 638 is transmitted to the SCP. When the H/on report 638 comes from the SSP, a service termination procedure is executed for terminating the service and releasing the IP (639).

FIG. 7 illustrates the recorded message listening procedure in the automatic telephone responding service. This is a procedure in which the received voice message can be heard.

When the recorded message listening procedure is selected through the function selecting procedure, in order to transmit (701) the message, the stored position of the received message and the message code information are loaded on an SM req/ind operation 702 so as to send (703) them through the SSP to the IP.

In order to execute a message transmission processing 704, the IP transmits (705) a voice message to the subscriber 706 by utilizing the message code information of the received SM req/ind operation 703. In order to report the completion of the message transmission to the SCP, the IP sends (708) an SRR resp/conf operation 707 through the SSP to the SCP.

Upon receipt of the SRR resp/conf operation, the SCP loads a guide announcement information (for checking (709) the service continuation) on a PCUI req/ind operation 710 so as to send it through the SSP to the IP.

Upon receipt of the PCUI req/ind operation 711, the IP executes a guide announcement and information collection processing 712. For this purpose, in accordance with the PCUI req/ind (the guide announcement number) 711, the IP transmits a resource 713 "input 1 for further absence registration and registration release, and input 2 for the service termination" to the subscriber 714. When the first digit information is being input by the subscriber 714, the guide announcement is terminated, and the digit information is collected. The collected information is loaded on a CUI req/ind operation 715 to send (716) it through the SSP to the SCP.

Figure 8B:
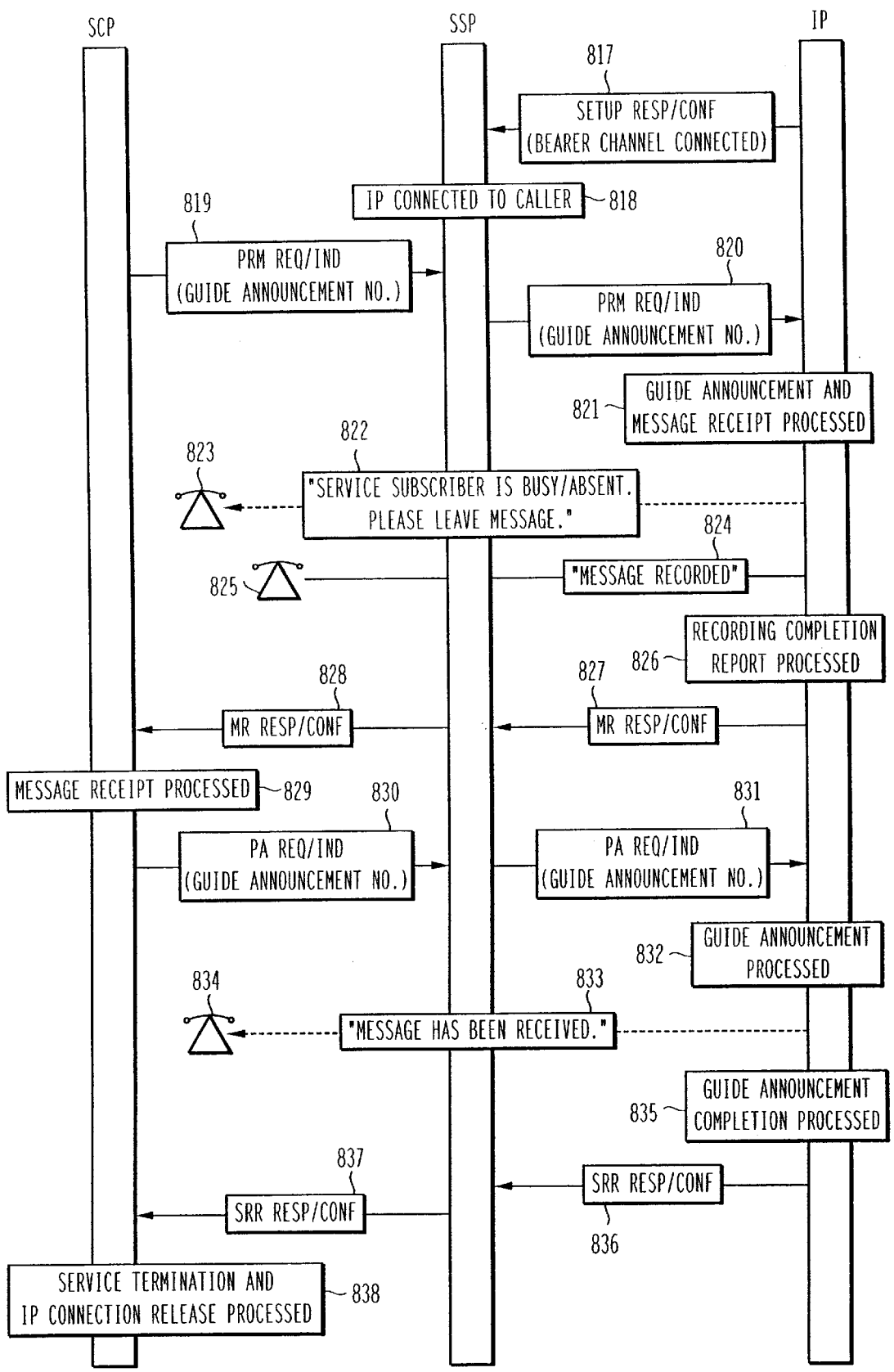

FIG. 8 illustrates the automatic telephone responding procedure in the automatic telephone responding service. This is a procedure in which a caller who has been successful in an authentication procedure 801 leaves a message into the MN of the service subscriber.

After successfully going through the authentication procedure 801, the SCP searches into the profile of the service subscriber based on the MN inputted by the caller, so as to confirm (802) on the absence registration. If a checked result 803 for the absence registration shows an absence registration release status, a called number interpretation is carried out (804) for providing a routing information, so that the SSP can execute a routing processing on the call. Further, in order to request for connection to the service subscriber, a call connect request/indication (to be called "CON req/ind" below) operation 805 and a resource status report request/indication (to be called "RSR req/ind" below) operation 806 are transmitted to the SSP. Upon receipt thereof, the SSP confirms as to whether the connection to the service subscriber is possible (807). If a connectibility 808 is in an idle state, a connection to the service subscriber is attempted (809). If the service subscriber responds, then a communication is carried out between the caller and the service subscriber.

If the service subscriber is using the line or non-responding (810), or if the connectibility 808 shows a busy line, a non-connectibility processing 811 is executed. When doing this, the non-connectibility is reported to the SCP in the form of a status report request/indication (to be called "SR req/ind" below) operation 812.

In the case where the SCP receives the SR req/ind (busy/non-responding) operation 812, or where the service subscriber registered an absence (803), the SCP executes an automatic telephone responding processing 813. Then in order to transmit a guide announcement and to record a message, the SCP transmits a CTR req/ind operation 814 to the SSP for a resource connection with the IP.

Upon receipt of the CTR req/ind operation 814, the SSP executes a bearer channel setup processing 815 in relation with the IP in accordance with the IP routing address. For this purpose, the SSP transmits a setup req/ind operation 816 to the IP.

Upon receipt of the setup req/ind, the IP sends a setup resp/conf operation 817 to the SSP, if the resource is available. Upon receipt of the setup resp/conf 817, the SSP connects the IP to the caller, and waits for a command message (818). In order to transmit a guide announcement for recording a message, the SCP loads guide announcement information on a prompt and receive message request/indication (to be called "PRM req/ind" below) operation 819 so as to send (820) it through the SSP to the IP.

Upon receipt of the PRM req/ind operation 820, the IP executes a guide announcement and message receiving processing 821. For this purpose, the IP transmits a resource 822 "The service subscriber is busy/absent. Please leave a message." to the caller 823 in accordance with the guide announcement number 820 of the PRM req/ind.

When the first voice signal is being inputted (824) from the caller 823, the IP terminates the guide announcement, and receives (824) the voice message to store it within the IP. Then in order to carry out a recording completion report processing 826, a recording completion information is loaded on a message received response/confirm (to be called "MR resp/conf" below) operation 827 to send (828) it through the SSP to the SCP.

The IP loads the recording completion information on the MR resp/conf operation 827 to send it through the SSP to the SCP. Upon receipt of the MR resp/conf operation 828, the SCP executes a message receipt processing (829). That is, the message receipt information such as the caller number, the message receiving time period and the like are recorded into the profile of the service subscriber, thereby carrying out a message receiving processing 829. In order to report the receipt of the message to the user, a guide announcement information is loaded on a play announcement request/indication (to be called "PA req/ind" below) operation 830 so as to be sent (831) through the SSP to the IP.

Upon receipt of the PA req/ind operation 831, the IP executes a guide announcement processing 832. For this purpose, the IP sends a resource 833 "the receipt of a message is received" to the caller 834 in accordance with the PA req/ind announcement number 831. Further, for carrying out a guide announcement transmission completion processing, the IP loads a guide announcement transmission completion information on an SRR resp/conf operation 836 to send (837) it through the SSP to the SCP. Upon receipt of the SRR resp/conf operation 837, the SCP executes a service termination and connection releasing procedure 838.

Figure 9:
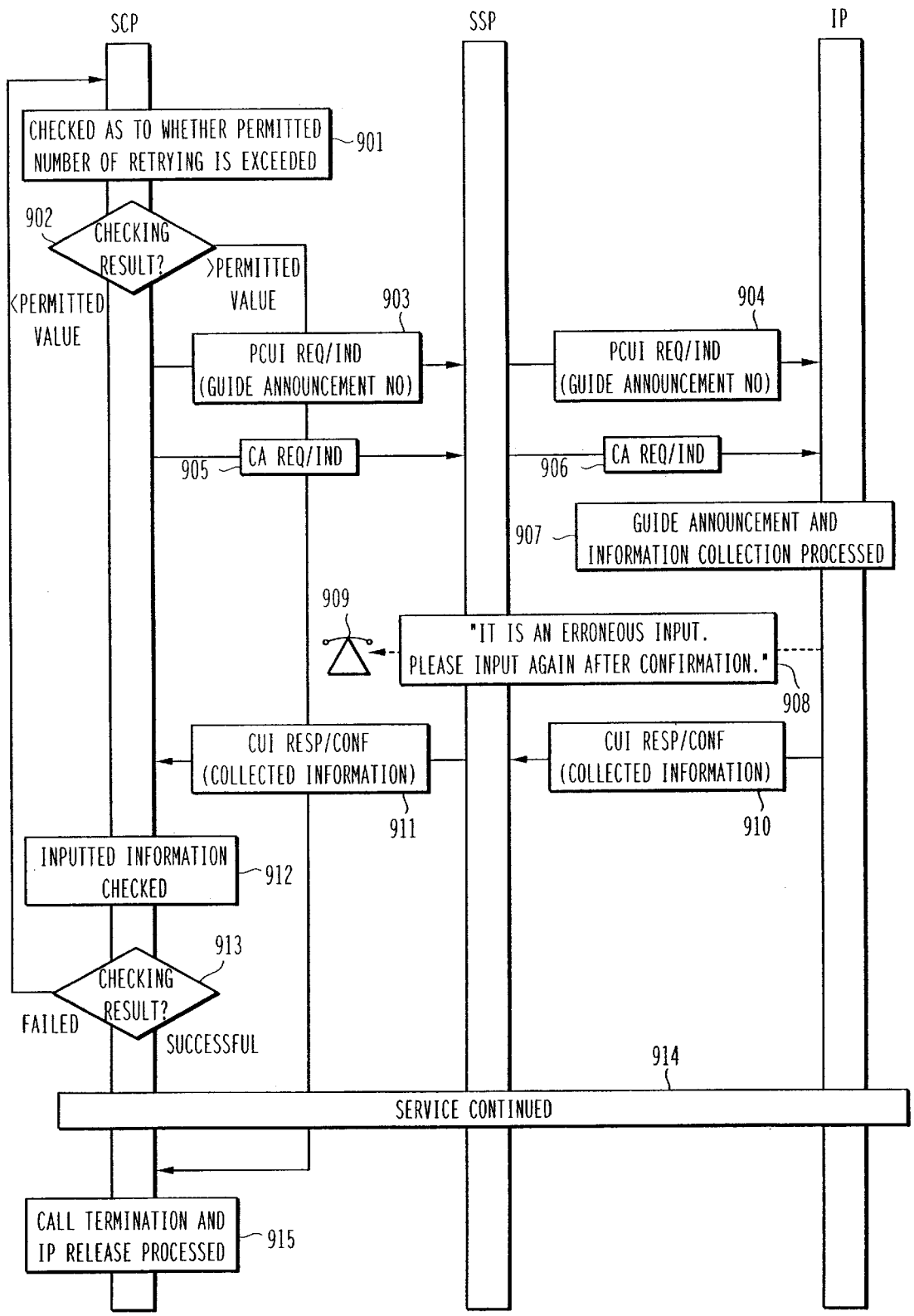
FIG. 9 illustrates the recognition failure reporting and retrying procedure in the automatic telephone responding service.

FIG. 9 illustrates the recognition failure reporting and retrying procedure in the automatic telephone responding service. This is a procedure in which a caller who has failed in the authentication procedure carries out a retrying.

When the recognition is failed, the SCP confirms (901) as to the exceeding of the permitted number of the retrying. If a checking result 902 shows that the permitted number has been exceeded, the SCP executes a call termination and IP releasing processing 915. If the permitted number has not been exceeded, the SCP loads a guide announcement information (for collecting an additional information) on a PCUI req/ind operation 903 to send (904) it through the SSP to the IP. Further, if needed, the SCP transmits (906) a CA req/ind operation 905 through the SSP to the IP.

Upon receipt of the PCUI req/ind operation 904, the IP executes a guide announcement and information collection processing 907. For this purpose, the IP transmits (908) a resource "It is an erroneous input. Please confirm and input again" to the subscriber 909 in accordance with the guide announcement number 904 in the PCUI req/ind. When the first digit information is being input by the subscriber, the guide announcement is terminated, and the digit information is collected to load the collected information on a CUI resp/conf operation 910 so as to send (911) it through the SSP to the SCP.

The SCP checks (912) the received information, and if a checking result 913 shows a failure, the authentication failure reporting and retrying procedure 901 is executed. If the checking result 913 shows a success, a service processing is continued (914).

Figure 10:
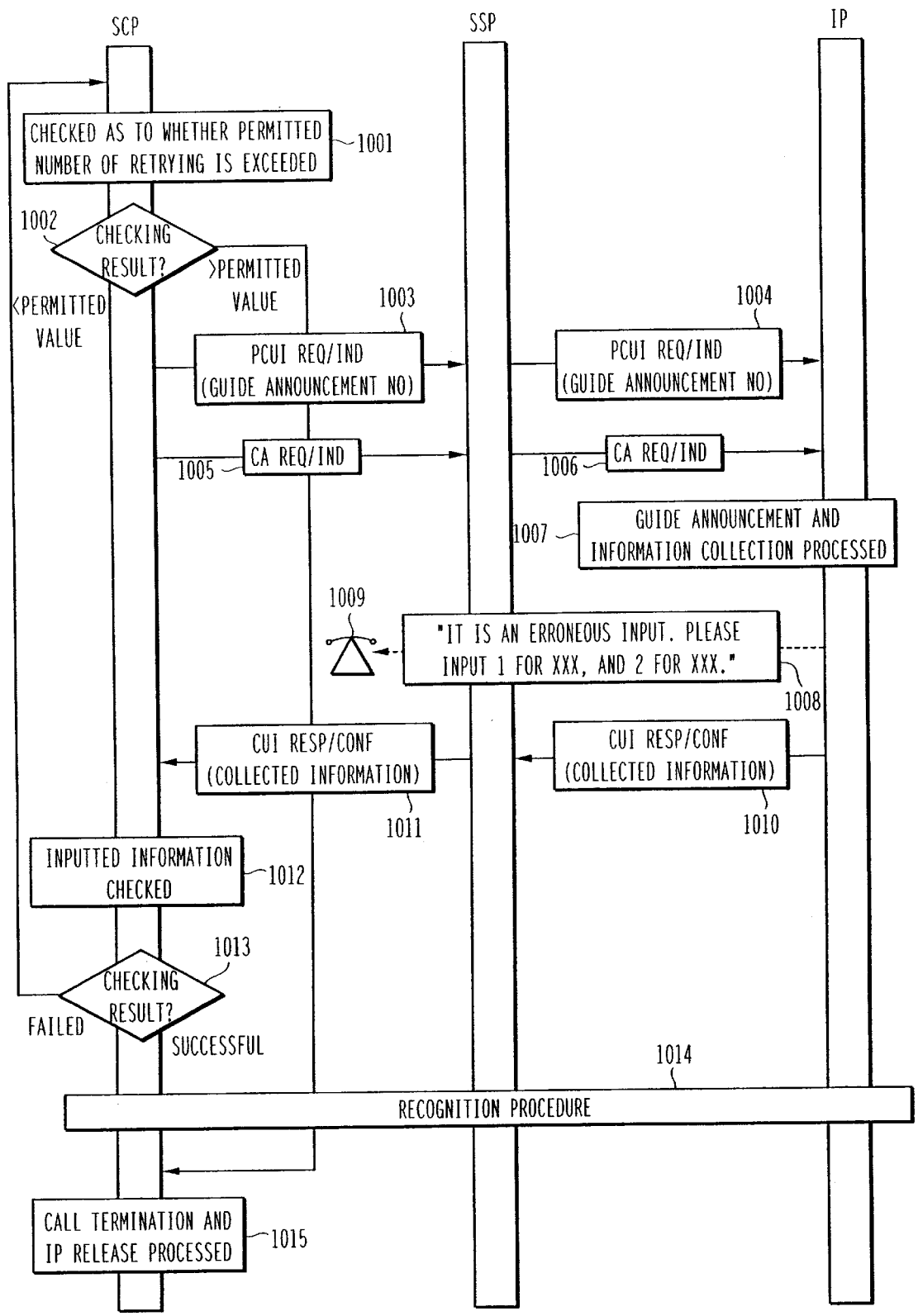
FIG. 10 illustrates the error inputting and retrying procedure in the automatic telephone responding service.

FIG. 10 illustrates the error inputting and retrying procedure in the automatic telephone responding service. This is a procedure in which the caller retries the inputting when a service implementation is impossible due to an erroneous inputting.

In the case of an erroneous inputting, the SCP checks (1001) on whether the permitted number of attempts at re-inputting has been exceeded. If a checking result 1002 shows that the permitted number has been exceeded, the SCP executes a call termination and IP releasing procedure 1015. If the permitted number has not been exceeded, the SCP loads a guide announcement (for collecting an additional information) on the PCUI req/ind operation 1003 to send it through the SSP to the IP. Further, if needed, the SCP transmits (1006) a CA req/ind operation 1005 through the SSP to the IP.

Upon receipt of the PCUI req/ind operation 1004, the IP executes a guide announcement and information collection processing 1007. For this purpose, the IP transmits (1008) a resource "It is an erroneous input. Please input 1 for xxx, and 2 for xxx" to the subscriber 1009. Then when the first digit information is being input by the subscriber, the guide announcement is terminated, and the digit information is collected. Then the collected information is loaded on a CUI resp/conf operation 1010 so as to be sent (1011) through the SSP to the SCP.

The SCP checks (1012) the received input information, and if a checking result 1013 shows a failure, the erroneous inputting and re-inputting procedure 1001 is executed. If the checking result 1013 shows a success, a service processing is continued (1014).

FIG. 11 illustrates the service terminating procedure in the automatic telephone responding service.

In order to request (1101) a service termination and IP release processing, the SCP transmits a release call request/indication (to be called "RC req/ind" below) operation 1102 and a disconnect forward connection request/indication (to be called "DFC req/ind" operation 1103 to the SSP.

Upon receipt of the operations 1102 and 1103, the SSP executes a call termination and IP release processing 1104.

Thus the SSP releases (1105) the IP network call of a subscriber 1106, and releases the bearer connection. For this purpose, the SSP transmits a release response/confirm (to be called "REL resp/conf" below) operation to the IP. Upon receipt thereof, the IP releases the bearer channel, and sends it through a release complete response/confirm (to be called "RLC resp/conf" below) operation 1108 to the SSP.

According to the present invention as described above, a high level IP network including an SSP, an SCP and an IP is utilized for connecting it to the existing telephone network, to the ISDN and the like. In this manner, INAP operations are utilized to furnish automatic responding services. Therefore, even if an existing telephone subscriber does not have an automatic responding telephone, voice messages can be received after an absence or a busy line.

What is claimed is:

1. A method for providing automatic telephone response services by using an intelligent peripheral system (IP), said method comprising the steps of:

authenticating a request for an automatic telephone responding service when a service subscriber dials a service access code (SAC) and a mail number (MN);

determining, based on a result of the authenticating step, the SAC and the MN;

determining a type of the SAC when the authentication is successful;

selecting a function if the SAC is determined to be an SAC 1;

listening to and receiving a recorded message based on the selected function;

registering or releasing an absence in a service subscriber profile of an Service Control Point (SCP) based on the selected function;

recording a voice message into an IP if the type of the SAC is determined to be an SAC 2, and if the service subscriber is absent or non-responding or if the line is busy;

attempting to input an error or to retry when the authentication of the SAC, MN and a secret number are not successful;

carrying out an authentication failure reporting or retrying within a limit of a permitted number of re-tries; and terminating the automatic telephone responding service when exceeding the limit of the permitted number of re-tries.

2. The method as claimed in claim 1, wherein the step of carrying out an authentication procedure comprises the steps of:

confirming the SAC, MN and secret number of the service subscriber in a sequential manner; and furnishing information and sharing an expense to the service subscriber based on the confirmation at the previous step.

3. The method as claimed in claim 1, wherein the step of carrying out an authentication procedure comprises the steps of:

confirming the SAC, MN and secret number of the service subscriber in a sequential manner; and permitting a service non-subscriber leave a voice message or connecting the service non-subscriber to service subscriber based on the confirmation at the previous step.

4. The method as claimed in claim 1, wherein the step of carrying out an authentication procedure comprises the steps of:

authenticating an automatic telephone responding service call by a service switching point (SSP) when a service subscriber or a service user dials the SAC and the MN;

transmitting an IDP req/ind operation together with the SAC and MN to said SCP, for requesting for IP service processing;

determining whether a service is to be furnished or not by checking on a subscription status by referring to a service subscription table by said SCP;

verifying the SAC and MN;

reporting an authentication failure and repeating the verifying step when the verifying step shows a failure;

determining, based on a type of the SAC, when the verifying step shows a success;

executing an automatic telephone responding procedure if the type of the SAC is determined to be an SAC 1;

requesting of said SSP, by said SCP, for a resource connection with said IP for collecting secret number information from the service subscriber, if the type of the SAC is determined to be a SAC 2;

transmitting a CTR req/ind (connect resource request/indication) operation to said SSP for a resource connection with said IP;

transmitting a bearer setup req/ind operation to said IP by said SSP, for establishing a bearer connection with said IP in accordance with an IP routing address;

transmitting back the bearer setup req/ind operation to said SSP by said IP when the requested resource is available;

connecting said IP to the service subscriber or the service user by said SSP, and waiting for a command operation from said SCP;

transmitting a prompt and collect user information req/ind (PCUI req/ind) operation through said SSP to said IP, for collecting information on a secret number;

transmitting a guide announcement to the subscriber by said IP based on the PCUI req/ind operation;

terminating the guide announcement when first digit information is being input by the subscriber, and collecting digit information to load it on a PCUI resp/conf so as to send it through said SSP to said SCP;

receiving information on the secret number from said SCP by said IP for verification;

reporting a recognition failure and repeating verification when the checking on the secret number fails; and selecting a function when the verification of the secret number is successful.

5. The method as claimed in claim 1, wherein the step of selecting a function comprises the steps of:

loading guide announcement information for a function selection request on a PCUI req/ind operation for transmission through a service switching point (SSP) to said IP by said SCP, when the authentication procedure has been successfully carried out;

transmitting to the subscriber, by said IP, a guide announcement upon receipt of the PCUI req/ind operation, to execute a guide announcement and information collection processing, in accordance with the PCUI req/ind operation;

terminating the guide announcement when the first digit information is being input by the subscriber, and collecting the digit information to load the collected information on a CUI (collect user information) req/ind operation for transmission through said SSP to said SCP;

checking, by said SCP, a received function selecting number;

executing an error inputting and retrying procedure, if the checking fails; and listening to a recorded message, when the checking is successful, if the function selecting number is 1, while executing an absence registration and registration releasing procedure, if the number is 2.

6. The method as claimed in claim 1, wherein the step of registering or releasing an absence comprises the steps of:

loading, by said SCP, a guide announcement information for an absence registration and releasing on a PCUI req/ind operation for transmission through a service switching point (SSP) to said IP;

transmitting, by said IP, a guide announcement to the subscriber upon receipt of the PCUI req/ind operation, for executing a guide announcement and information collection processing;

terminating the guide announcement, when the first digit information is being input by the subscriber, and collecting the digit information to load it on a CUI req/ind operation for transmission through said SSP to said SCP;

checking, by said SCP, said collected digit information;

executing an error inputting and retrying procedure, if the checking fails;

judging on an absence registration processing if the checking is successful;

processing an absence registration case of an; and executing an absence registration release processing for an absence registration release.

7. The method as claimed in claim 6, wherein the step of processing an absence registration comprises the steps of:

loading a guide announcement information on a PCUI req/ind operation for transmission through said SSP to said IP so as to confirm whether the absence registration has been completed and whether the service is to be continued;

executing by said IP a guide announcement and information collection processing upon receipt of a PCUI req/ind operation by sending a guide announcement to a subscriber in accordance with a PCUI req/ind operation; and terminating a guide announcement when a first digit information is being input by the subscriber, and collecting the digit information to load it on a CUI req/ind operation so as to send it through said SSP to said SCP.

8. The method as claimed in claim 6, wherein the step of processing an absence registration comprises the steps of:

loading a guide announcement information on a PA req/ind operation for transmission through said SSP to said IP;

executing, by said IP, a guide announcement processing by sending a guide announcement to the subscriber in accordance with the PA req/ind operation;

reporting, by said IP, the completion of a guide announcement to said SCP by transmitting a specialized resource report response/confirm (SRR resp/conf) operation through said SSP to said SCP;

transmitting, by said SCP, a message of a service non-subscriber to said IP by loading a received message stored position and a message code information on a send-message request/indication (SM req/ind) operation to be sent through said SSP to said IP;

transmitting, by said IP, a voice message to the subscriber by utilizing the message code information of a received SM req/ind operation;

reporting the transmitting to said SCP by sending status reporting req/ind (SR req/ind) operation to said SCP, if the subscriber hangs up after listening to a voice message; and executing a service termination procedure when a hang-up report comes from said SSP, for terminating the service and releasing said IP.

9. The method as claimed in claim 1, wherein the step of listening to a recorded message comprises the steps of:

transmitting the recorded message, the stored position of the recorded message and the message code information by loading them on an SM req/ind operation for transmission through a service switching point (SSP) to said IP, when the recorded message listening procedure is selected through the function selecting procedure;

transmitting, by said IP, a voice message to the subscriber by utilizing the message code information of a received SM req/ind operation so as to execute a message transmission processing;

sending, by said IP, an SRR resp/conf operation through said SSP to said SCP so as to report the completion of a transmission to said SCP;

loading, by said SCP, a guide announcement information for checking a service continuation on a PCUI req/ind operation so as to send it through said SSP to said IP;

executing, by said IP, a guide announcement and information collection processing by transmitting a guide announcement to the subscriber in accordance with the PCUI req/ind operation; and terminating the guide announcement when a first digit information is being input by the subscriber, collecting the digit information, and loading the collected digit information on a CUI req/ind operation for transmission through said SSP to said SCP.

10. The method as claimed in claim 1, herein the step of reporting an authentication failure and retrying comprises the steps of:

checking and confirming, by said SCP, as to the exceeding of the permitted number of re-tries, when the authentication fails;

executing, by said SCP, a call termination and an IP releasing processing, if a checking result shows that the permitted number of re-tries has been exceeded;

loading, by said SCP, a guide announcement information on a PCUI req/ind operation for transmission through said SSP to said IP, if the permitted number of re-tries has not been exceeded;

transmitting, by said SCP, a CA req/ind operation through a service switching point (SSP) to said IP, if needed;

executing, by said IP, a guide announcement and information collection processing upon receipt of the PCUI req/ind operation, and transmitting, by said IP, a guide announcement to the subscriber in accordance with the guide announcement number in the PCUI req/ind;

terminating, by said IP, the guide announcement when a first digit information is being input by the subscriber, and collecting the digit information to load the collected information on a CUI resp/conf operation for transmission through said SSP to said SCP;

checking, by said SCP, the received information;

executing the authentication failure reporting or retrying procedure, if a checking result shows a failure; and continuing a service processing, if the checking result shows a success.

11. The method as claimed in claim 1, wherein the step of carrying out an error inputting and retrying procedure comprises the steps of:

checking, by said SCP, whether a permitted number of re-inputs has been exceeded in case of an erroneous inputting;

executing, by said SCP, a call termination and IP releasing procedure, if a checking result shows that the permitted number has been exceeded;

loading, by said SCP, a guide announcement for collecting an additional information on the PCUI req/ind operation to send it through a service switching point to said IP, if the permitted number has not been exceeded;

transmitting by said SCP a CA req/ind operation through said SSP to said IP;

executing, by said IP, a guide announcement and information collection processing upon receipt of the PCUI req/ind operation, and transmitting by said IP a guide announcement to the subscriber in accordance with the guide announcement number;

terminating the guide announcement when the first digit information is being input by the subscriber, and collecting the digit information to load the collected information on a CUI resp/conf operation for transmission through said SSP to said SCP;

checking, by said SCP, the received input information;

executing the erroneous inputting and re-inputting procedure, if a checking result shows a failure; and continuing a service processing, if the checking result shows a success.

12. The method as claimed in claim 1, wherein the step of terminating the service comprises the steps of:

transmitting, by said SCP, a release call request/indication (RC req/ind) operation and a disconnect forward connection request/indication (DFC req/ind) operation to a service switching point (SSP) in order to request a service termination and IP release processing;

executing, by said SSP, a call termination and IP release processing upon receipt of the above mentioned operations;

releasing, by said SSP, said IP network call of a subscriber, for releasing a bearer connection, by transmitting a release response/confirm (REL resp/conf) operation to said IP; and releasing, by said IP, the bearer connection upon receipt of the REL resp/conf operation, and sending it through a release complete response/confirm (RLC resp/conf) operation to said SSP.

* * * * *